Sept. 24, 1929.  A. J. JANSSON  1,728,935
BRAKE MECHANISM
Original Filed June 11, 1926    4 Sheets-Sheet 1
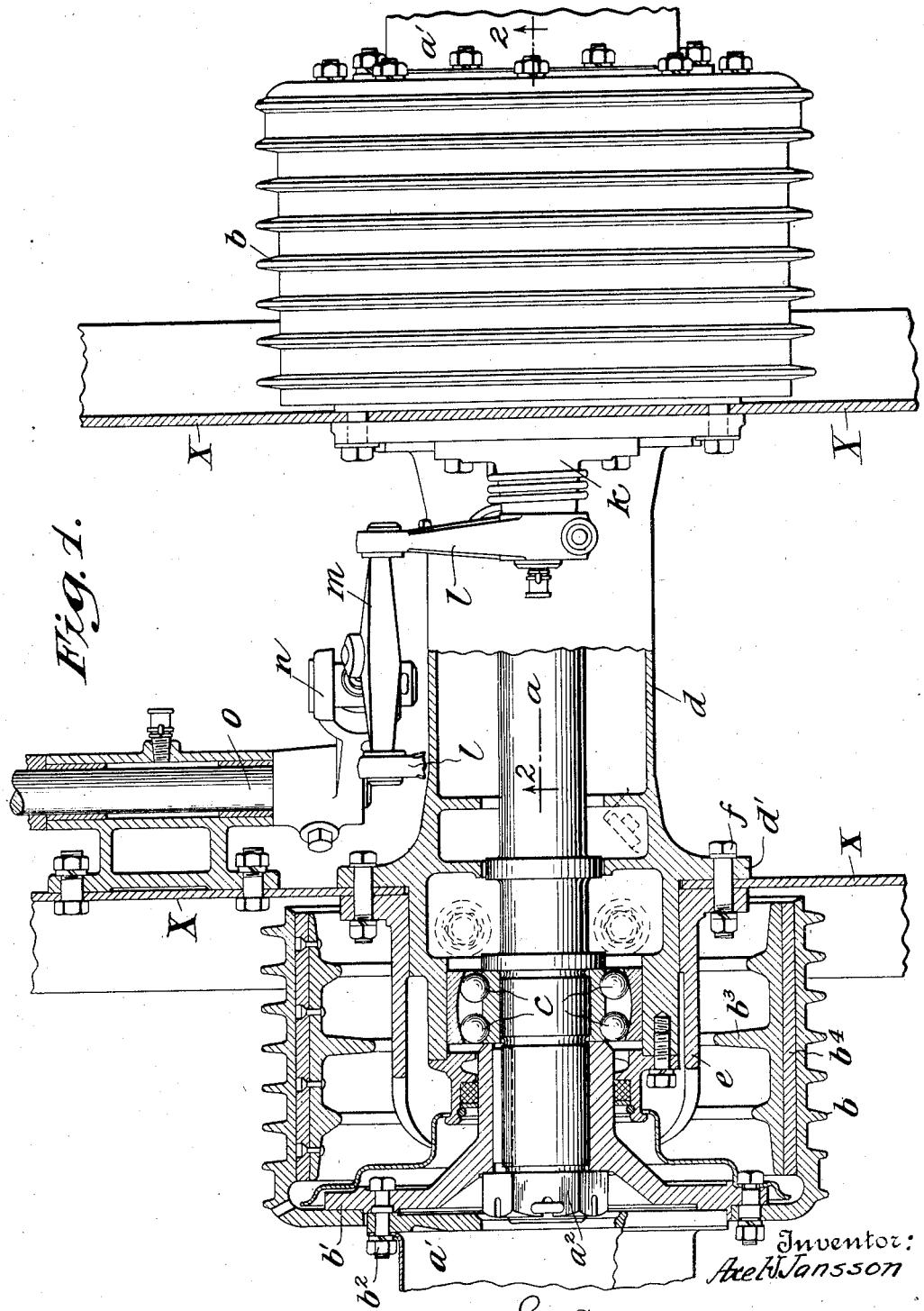

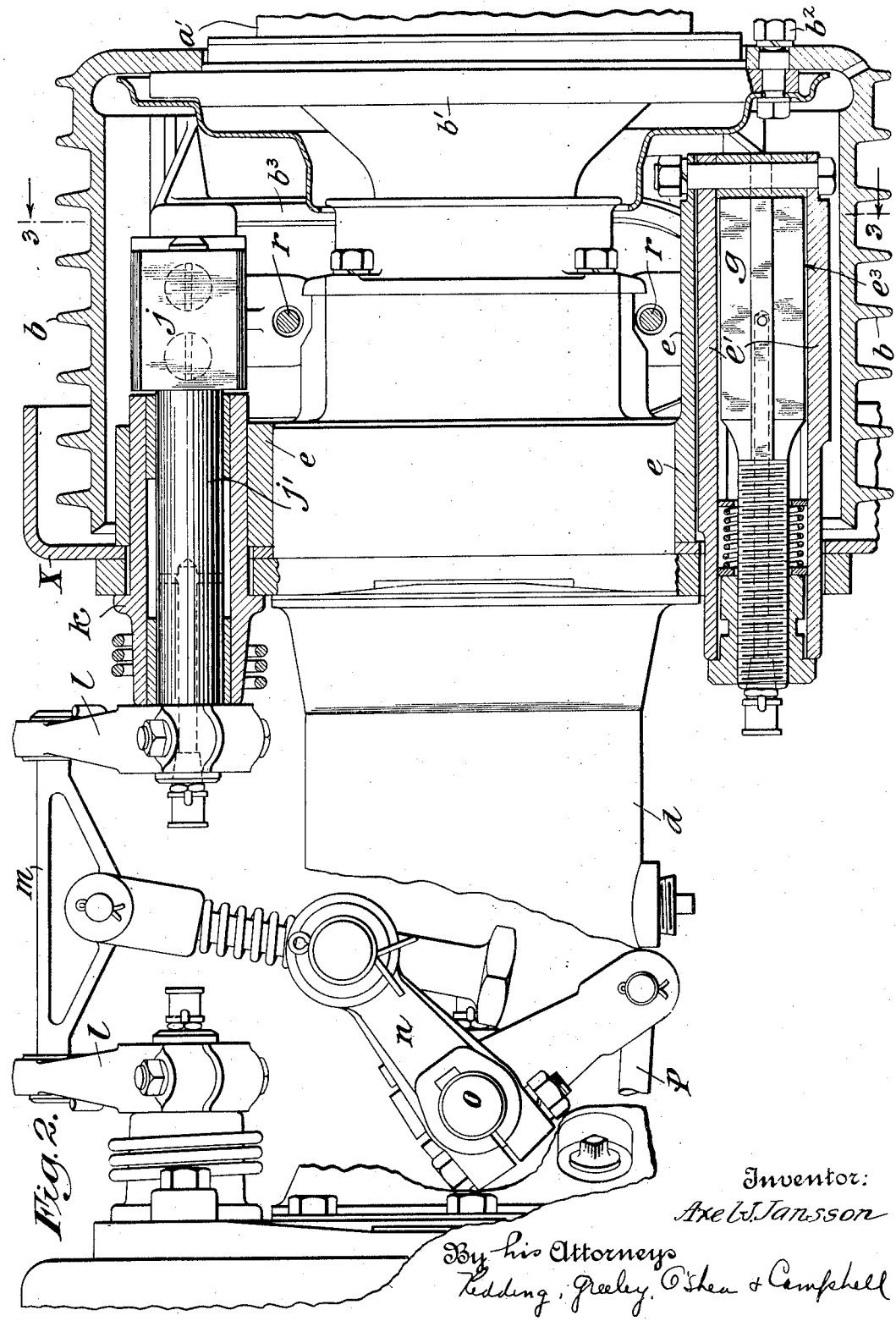

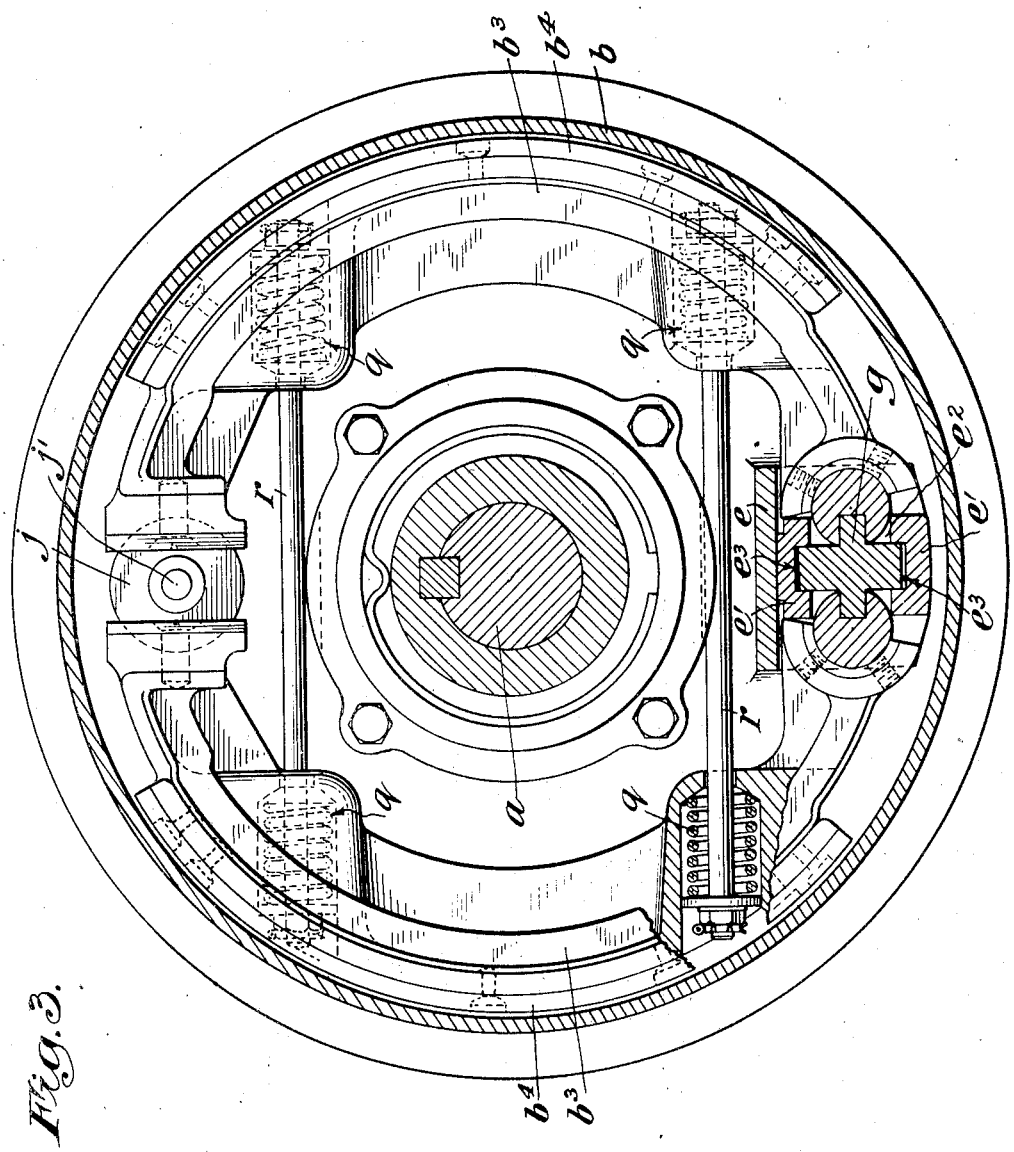

Sept. 24, 1929.  A. J. JANSSON  1,728,935
BRAKE MECHANISM
Original Filed June 11, 1926  4 Sheets-Sheet 4
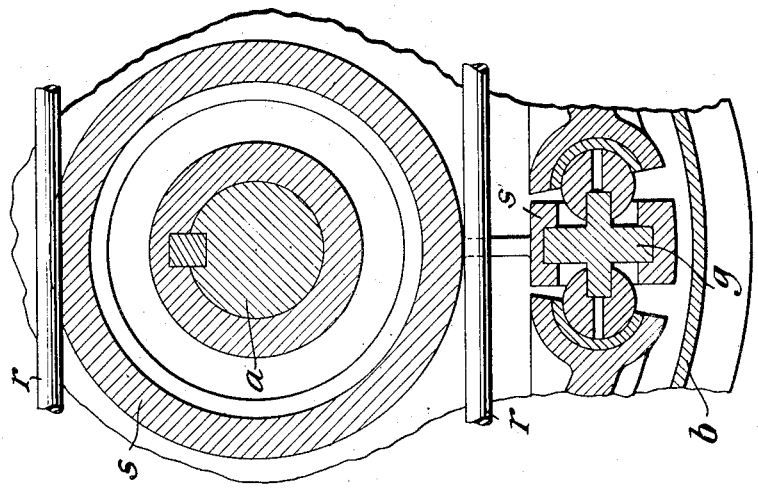
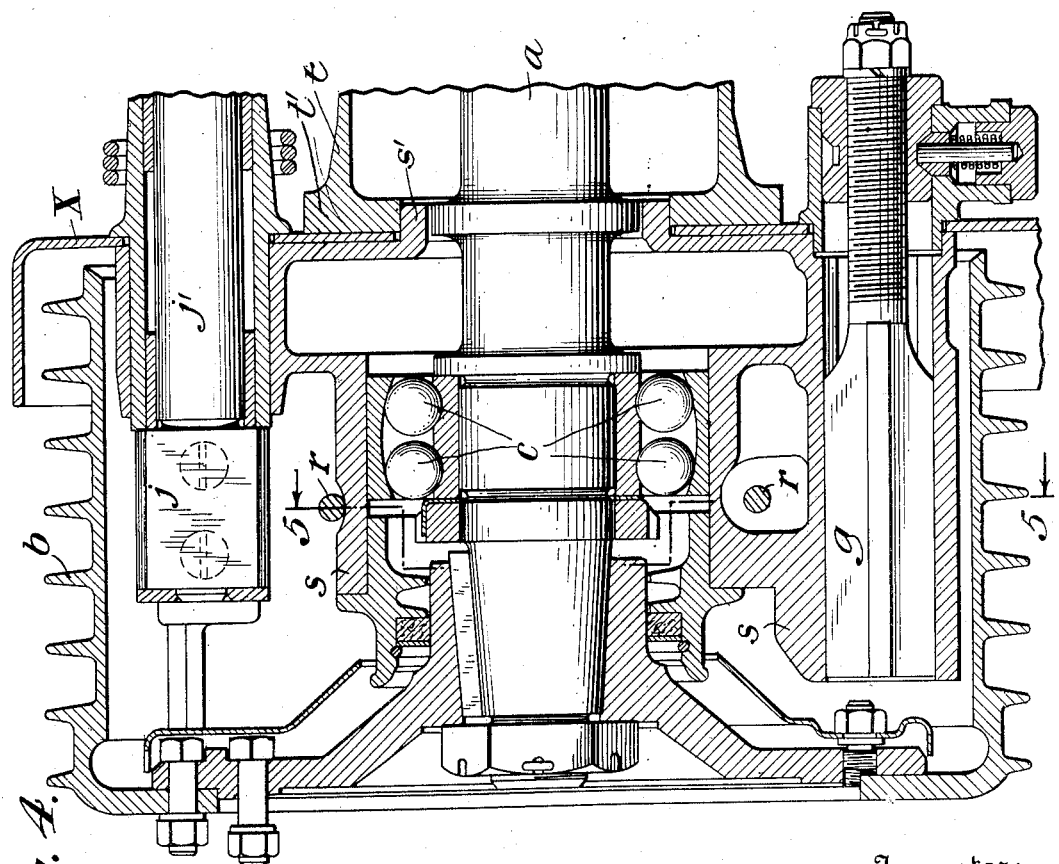
Inventor:
Axel J. Jansson
By his Attorneys
Redding, Greeley, O'Shea & Campbell Patented Sept. 24, 1929

1,728,935

UNITED STATES PATENT OFFICE

AXEL J. JANSSON, OF HILLSIDE, NEW JERSEY, ASSIGNOR TO INTERNATIONAL MOTOR COMPANY, OF NEW YORK, N. Y., A CORPORATION OF DELAWARE

BRAKE MECHANISM

Original application filed June 11, 1926, Serial No. 115,155. Divided and this application filed October 10, 1927. Serial No. 225,120.

This invention relates to brake mechanisms, and in some aspects more particularly to propeller shaft brakes for motor vehicles as set forth fully in my co-pending application Serial No. 115,155, filed June 11, 1926. This application, which is a division of my said co-pending application, relates only to so much of my prior application as pertains to the equalizing means by which it is sought to effect a division of the braking effort applied to the rotating member to be retarded in the interest of a balance of the braking torque and to increase the braking forces applied to the propeller shaft in a structure which is practical from the standpoint of manufacture and use. These ends are attained by the interposition within a line of shafting, such as a propeller shaft, of a short shaft section carrying spaced brake drums at its ends supported by bearings in a frame element which is maintained against distortion at spaced points, as by spaced transverse frame members in a motor vehicle. More particularly a cylindrical frame member is adapted to support the short shaft section by means of spaced bearings and to be in turn supported from the transversely extending supporting members. It is further sought to so distribute the propeller shaft bearings as to support the propeller shaft at the points where the brake torque is applied. To this end the brake drums are so secured to the propeller shaft section by means of spiders as to overlie the ends of the shaft section and include, respectively, the planes of the bearings.

For a fuller understanding of the invention reference is to be had to the following detailed description thereof taken in connection with the accompanying drawings, in which:

Figure 1 is a view showing, in plan, the brake mechanism according to the present invention, parts being removed in the interest of clearness to show the manner of supporting a short shaft section interposed in the propeller shafting at spaced points.

Figure 2 is a view on an enlarged scale taken in the vertical plane indicated by the line 2—2 in Figure 1, and looking in the direction of the arrows.

Figure 3 is a transverse vertical sectional view taken in the plane indicated by the line 3—3 in Figure 2, and looking in the direction of the arrows.

Figure 4 is a view substantially similar to that indicated at the right-hand side of Figure 1, but showing a modification of the brake anchor.

Figure 5 is a fragmentary sectional view taken in the planes indicated by the broken line 5—5 in Figure 4, and looking in the direction of the arrows.

In Figure 1 a short shaft section $a$ is illustrated as adapted to be interposed in the line of a propeller shaft to which it is connected by the universal joints $a'$, $a'$. The shaft section carries at its ends brake drums $b$ which are secured thereto by the spider $b'$ keyed thereon and prevented from axial displacement by the nuts $a^2$, the spiders being also availed of as securing means for the universal joints by means of the bolts $b^2$. Within the confines of the respective brake drums, the shaft is journaled in bearings $c$ in a cylindrical supporting element $d$ secured as by the flange $d'$ to spaced transverse frame members X, X closely positioned with respect to the brake drums. Thus the tortional stresses applied to the shaft through the brake drums are resisted by the reaction of the bearings supported within the drums. Inwardly of the brake drums are the brake shoes $b^3$, $b^3$ bearing the brake linings $b^4$ and supported generally from a cylindrical anchor member $e$ which may be secured by the same bolts $f$ which secure the flanges $d'$ of the support to the frame members X. The brake anchor also serves as a shield for the end of the support $d$. At its lowermost part, the brake anchor $e$ is formed with an extension $e'$ slotted as at $e^2$ and inwardly grooved as at $e^3$ to receive a cruciform wedge member $g$ wherewith to compensate for wear in the brake linings. The brake shoes are expanded by a cam $j$ carried upon the end of a shaft $j'$ journaled in a cylindrical bearing $k$ also carried with the anchor member $e$. This shaft carries, at its outer end, an arm $l$ pivotally connected to the link member $m$ which connects the respective arms actuating the shoes of both brake drums and is centrally connected to the bell crank $n$ on the shaft $o$ journaled in a bearing carried on a cross frame member X. Actuation of the brakes may be effected either by the rotation of the shaft $o$ or by a link $p$ secured to the other end of the bell crank. The brake shoes are retracted against the action of the cam $j$ through the instrumentality of the springs $q$ bearing against links $r$ extending between the shoes.

In Figures 4 and 5 there is illustrated a modification of the invention in which the cylindrical member terminates at the cross frame members X and the brake anchors $s$ support the bearings $c$ for the shaft section and are in turn supported by the frame. It will be noted that the cylindrical supporting element $t$, in this instance, terminates in a flange $t'$ which abuts against frame member X and is positioned by an extension $s'$ of the anchor member.

In operating the brakes, the forces imparted to the link $m$ will be approximately evenly apportioned between shafts $j'$ when the arms $l$ are positioned so that their moment arms are equal, the brake linings being in about the same condition. Thus a ready adjustment of the relative braking forces of the two brakes is possible. On rotation of the shafts $j'$, the cams $j$ rotate between the ends of the brake bands, expanding the same, to cause the brakes to function in the usual manner.

It will thus be seen that a brake mechanism has been provided wherein braking torque is applied at spaced points in a balanced structure having advantageous features from the standpoint of manufacture and use.

While the invention has been illustrated as applied to the propeller shaft of a motor vehicle, it will be apparent that in many aspects it is not limited to such use but is applicable in any situation where a rotating element is to be retarded, and various modifications may be made in the disposition and composition of the component elements of the brake mechanism without departing from the spirit and scope of the invention, no limitation being intended except as indicated in the appended claims.

What I claim is:

1. In brake mechanism, in combination, a propeller shaft, spaced brake drums carried by the propeller shaft, brake shoes for the respective drums, brake operating means, and operative connections between the respective brake shoes and said means to distribute and balance the braking power equally between the drums.

2. In brake mechanism, in combination, a propeller shaft, spaced brake drums carried by the propeller shaft, a bearing support, spaced bearings for the propeller shaft within the confines of the respective brake drums, brake shoes for the respective drums, brake operating means, and operative connections between the respective brake shoes and said means.

3. In brake mechanism, in combination, a propeller shaft, a bearing support, spaced bearings for the propeller shaft, a cylindrical brake anchor member concentric with the bearing support and carried therewith, spaced brake drums carried with the propeller shaft, brake shoes for the respective brake drums, brake operating means, and operative connections between the respective brake shoes and said means.

4. The combination with a driving shaft and a driven shaft, of a short shaft section interposed therebetween, a bearing support, spaced bearings for the short shaft section carried by the bearing support, spaced brake drums carried on the short shaft section near the ends thereof, brake shoes for the respective drums, brake operating means and operative connections between the respective brake shoes and said means.

5. The combination with a driving shaft and a driven shaft, of a short shaft section interposed therebetween, a bearing support, spaced bearings for the short shaft section carried by the bearing support, spaced brake drums carried on the ends of the short shaft section, brake shoes for the respective drums, brake operating means, operative connections between the respective brake shoes and said means, and connections between the short shaft section and said driving and driven shafts permitting relative movement therebetween.

6. In a brake mechanism, the combination with a driving shaft and a driven shaft, of a short shaft section, universal joints between the shaft section and the driving and driven shaft, respectively, spaced transverse frame members, a cylindrical bearing member carried by the frame members and within which the shaft section is disposed, spaced bearings for the shaft section within the bearing member, spaced brake drums carried with the respective ends of the shaft section and intersecting the planes of the bearings, sets of brake shoes within the respective drums, anchors for the sets of brake shoes carried with the bearing member, a rock shaft carried with one of the frame members, expanding devices for the respective sets of brake shoes, and operative connections between the rock shaft and the expanding devices to equalize braking torque between the drums.

This specification signed this 30th day of Sept. A. D. 1927.

AXEL J. JANSSON.